United States Patent
Zhou et al.

(10) Patent No.: US 10,429,274 B2
(45) Date of Patent: Oct. 1, 2019

(54) VERTICAL HIGH SPEED TESTING DEVICE FOR SPIRAL SEAL OF CONE BIT BEARING

(71) Applicant: Southwest Petroleum University, Sichuan (CN)

(72) Inventors: Yi Zhou, Sichuan (CN); Yueming Zheng, Sichuan (CN); Yang Xiao, Sichuan (CN); Xia Wang, Sichuan (CN); Tong Xu, Sichuan (CN); Yuxing Huang, Sichuan (CN); Yi Tang, Sichuan (CN); Bin Tan, Sichuan (CN)

(73) Assignee: Southwest Petrolem Univeristy

( * ) Notice: Subject to any disclaimer, the term of this patent is extended or adjusted under 35 U.S.C. 154(b) by 237 days.

(21) Appl. No.: 15/705,399

(22) Filed: Sep. 15, 2017

(65) Prior Publication Data
US 2018/0348090 A1    Dec. 6, 2018

(30) Foreign Application Priority Data

May 31, 2017 (CN) .......................... 2017 1 0398937

(51) Int. Cl.
*G01M 99/00* (2011.01)
*G01M 13/04* (2019.01)
*E21B 10/25* (2006.01)

(52) U.S. Cl.
CPC .......... *G01M 99/008* (2013.01); *G01M 13/04* (2013.01); *E21B 10/25* (2013.01)

(58) Field of Classification Search
CPC .. G01M 13/005; G01M 13/04; G01M 3/2869; G01M 99/008
USPC ..................................................... 73/152.01
See application file for complete search history.

(56) References Cited

U.S. PATENT DOCUMENTS 5,000,033 A * 3/1991 Turner ................ G01M 13/005
                                                                73/49.8
8,739,607 B2 * 6/2014 Slack .................. G01M 3/2869
                                                                73/46

FOREIGN PATENT DOCUMENTS

CN   201885855 U  *  6/2011
CN   105134083 A     12/2015
SU      903557 A1 *  2/1982

OTHER PUBLICATIONS

Ye Zibo, Study of Sealing Performance and Wear Mechanism of Oil Seal Used in Engine, A Dissertation Submitted for the Degree of Doctor of Philosophy South China University of Technology, Guangzhou, China (Year: 2009).*

(Continued)

*Primary Examiner* — Justin Seo
*Assistant Examiner* — David L Singer
(74) *Attorney, Agent, or Firm* — Wood Herron & Evans LLP (57) ABSTRACT

A vertical high-speed testing device for a spiral seal of a cone bit bearing is provided. The device includes an upper fixed plate, a liquid cylinder, a cone, a spiral sleeve, a shaft and a lower fixed plate. The spiral sleeve is in threaded connection to the cone. Both the cone and the spiral sleeve are sheathed on the shaft. Sealing threads are provided on an inner surface of the spiral sleeve, and there is a clearance between the sealing threads and the shaft. By the testing device, a spiral seal structure for a cone bit bearing is simulated, and the cone drives the spiral sleeve to rotate; and the sand draining performance of the spiral seal is tested by measuring the time required to drain sand-containing medium.

8 Claims, 5 Drawing Sheets

(56) References Cited

OTHER PUBLICATIONS

STIC partial human translation, Study of Sealing Performance and Wear Mechanism of Oil Seal Used in Engine, A Dissertation Submitted for the Degree of Doctor of Philosophy South China University of Technology, Guangzhou, China (Year: 2019).*
Pu Young, Development of a Roller Bits Seal Testing Machine, Drilling and Production Technology, vol. 32, No. 5, pp. 4, and 54-56 (Year: 2009).*
STIC human translation, Development of a Roller Bits Seal Testing Machine, Drilling and Production Technology, vol. 32, No. 5, pp. 4, and 54-56 (Year: 2019).*
TerraTek, Annual Report Support Research for Development of Improved Geothermal Drill Bits, Department of Energy Division of Geothermal Energy Attention Dr. Samuel G. Varnado Sandia Laboratories DOE Contract No. EG-76-C-07-1546 (Year: 1978).*
Laboratory drill rig for PDC bearing and cutter development, Diamond Tooling Journal, 1-09, Oil & gas (Year: 2009).*
Machine Translation CN 201885855 U (Year: 2019).*
Chinese Patent Office, Office Action issued in CN 201710398937.2 dated May 5, 2019 (7 pages).

* cited by examiner

VERTICAL HIGH SPEED TESTING DEVICE FOR SPIRAL SEAL OF CONE BIT BEARING

CROSS-REFERENCE TO RELATED APPLICATION

This application claims priority to Chinese application number 201710398937.2, filed May 31, 2017. The above-mentioned patent application is incorporated herein by reference in its entirety.

TECHNICAL FIELD

The present invention relates to the field of drilling engineering machinery, and in particular to a vertical high-speed testing device for a spiral seal of a cone bit bearing.

BACKGROUND

As the most important rock-breaking tool in the drilling engineering, cone bits play a leading role in the downhole rock-breaking operation, and their working performance directly influences the drilling quality, the drilling efficiency and the drilling cost. The service life of the cone bits almost directly depends on the service life of the bit bearings, and in turn, the service life of the bit bearings depends on the seal life. The recent development trend of cone bits is to realize their high speed. With the continuous increase in the rotation speed of bits, the weakness of common bearing seals used in the rough environment is increasingly prominent. Therefore, during the researches on bits, the improvements of the service life of bearings cannot be ignored. As the weakest link of a high-speed cone bit and a quick-wear component, a bearing seal is the most critical factor that determines the service life of the high-speed cone bit. A statistical analysis of field data has indicated that the failed bits caused by the early damage to bearings account for 80% of the total number of failed bits, and the bearings seriously worn due to the early failure of seals account for 30% of the total number of failed bearings. The bearing seal problem of the cone bits has become a technical bottleneck that seriously influences the drilling efficiency and drilling cost of high-speed cone bits, and has become a problem to be urgently solved in the oil drilling and production engineering at present.

The practices have indicated that the sealing performance of the current conventional cone bit bearings cannot meet the operation requirements very well; and particularly during drilling at a high rotation speed, the seals reveal short service life, poor durability, and serious wear and aging. The working conditions for seals of the cone bits are very severe, including high temperature, high-abrasiveness medium, high loads and very small sealed cavity. These working conditions and environments aggravate the failure of seals, and bring tremendous difficulties and challenges to the researches on seals. The entrance of the abrasive medium slurry is the most critical factor that influences the service life of seals for high-speed cone bits. The existing bearing seals belong to passive seals which have no automatic sand draining function, so that the seals will be quickly worn and thus failed once slurry particles enter the sealed cavity. At present, there are still no testing devices for a spiral seal of a high-speed cone bit. The experimental researches are the premise and guarantee for smoothly conducting field tests and product applications, and the testing devices are the key to determine whether the experimental researches are successful. The development of testing devices for a spiral seal of a high-speed cone bit is very important to improve the service life of bits.

Therefore, how to change the current situation in the prior art that it is unable to conduct tests on a spiral seal of a high-speed cone bit is a problem to be urgently solved by those skilled in the art.

SUMMARY

An objective of the present invention is to provide a vertical high-speed testing device and testing method for a spiral seal of a cone bit bearing to solve the problems in the prior art. By conducting reliability tests on the sealing effect of the cone bit, it is ensured that the spiral seal of the cone bit smoothly plays its role in the practical productions.

For this purpose, the present invention provides the following solutions. The present invention provides a vertical high-speed testing device for a spiral seal of a cone bit bearing, including an upper fixed plate, a liquid cylinder, a cone, a spiral sleeve, a shaft and a lower fixed plate. The spiral sleeve is in threaded connection to the cone; both the cone and the spiral sleeve are sheathed on the shaft; sealing threads are provided on an inner surface of the spiral sleeve, and there is a clearance between the sealing threads and the shaft. A first cavity, which is sealed, is formed between the cone and the shaft; a first through hole is formed in the shaft; and the first through hole is communicated with the first cavity. Each of the cone, the spiral sleeve and the shaft is arranged inside the liquid cylinder. The upper fixed plate and the lower fixed plate are connected to upper and lower ends of the liquid cylinder, respectively, to form a second cavity communicated with the first cavity.

In one embodiment, a second through hole and a third through are also formed on the shaft; and, both the second through hole and the third through hole are communicated with the second cavity, and the second through hole and the third through hole are communicated with each other through a pipeline.

In one embodiment, the first through hole is arranged coaxially to the shaft, and the second through hole and the third through hole are symmetrically arranged relative to an axis of the shaft.

In one embodiment, a distance between an axis of the second through hole and an axis of the third through hole is not greater than the inner diameter of the cone.

In one embodiment, the vertical high-speed testing device for a spiral seal of a cone bit bearing further includes a liquid container, and the first through hole, the second through hole and the third through hole are each communicated with the liquid container through pipelines.

In one embodiment, the vertical high-speed testing device for a spiral seal of a cone bit bearing further includes a collecting container; wherein, the collecting container is communicated with the second cavity through a pipeline; the first through hole is further communicated with the outside through a pipeline; and a valve is provided on the pipeline communicating the first through hole with the outside.

In one embodiment, the vertical high-speed testing device for a spiral seal of a cone bit bearing further includes a motor and a holder; wherein, the motor is connected to the cone through a coupler; and both the motor and the lower fixed plate are fixed to the holder.

In one embodiment, the vertical high-speed testing device for a spiral seal of a cone bit bearing further includes a bottom plate, and the holder is fixed on the bottom plate.

In one embodiment, an axis of the cone is perpendicular to a plane of the bottom plate.

Compared with the prior art, the present invention achieves the following technical effects: the vertical high-speed testing device for a spiral seal of a cone bit bearing of the present invention includes a spiral sleeve; sealing threads are provided on an inner side of the spiral sleeve to simulate a spiral seal structure for a cone bit bearing; a cone drives the spiral sleeve to rotate; and the sand draining performance of the spiral seal is tested by measuring the time required to drain the sand-containing medium, so that the smooth production and application of spiral seal products can be assured.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, explain the principles of the invention.

DETAILED DESCRIPTION

The technical solutions in the embodiments of the present invention will be clearly and completely described below with reference to the accompanying drawings in the embodiments of the present invention. Therefore, the embodiments described herein are merely a part but not to be considered all the embodiments of the present invention. All other embodiments obtained by those skilled in the art without any creative effort on the basis of the embodiments in the present invention shall fall into the protection scope of the present invention.

An objective of the present invention is to provide a vertical high-speed testing device for a spiral seal of a cone bit bearing to solve the problems in the prior art. By conducting reliability tests on the sealing effect of the cone bit, it is ensured that the spiral seal of the cone bit smoothly plays its role in the practical productions.

To make the objectives, features and advantages of the present invention more obvious and comprehensible, the present invention will be further described below in detail in conjunction with the accompanying drawings and the embodiments.

Figure 1:
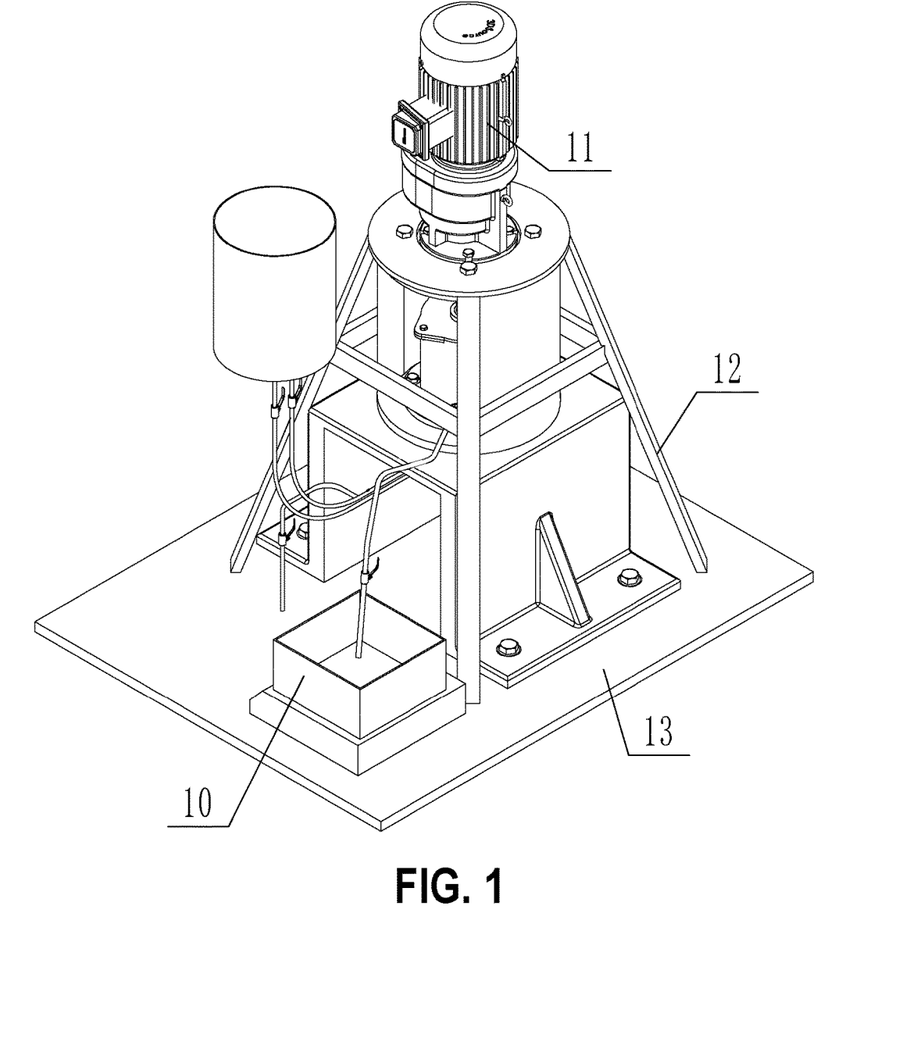
FIG. 1 is a top perspective view of the overall structure of a vertical high-speed testing device for a spiral seal of a cone bit bearing, according to the present invention.
Figure 2:
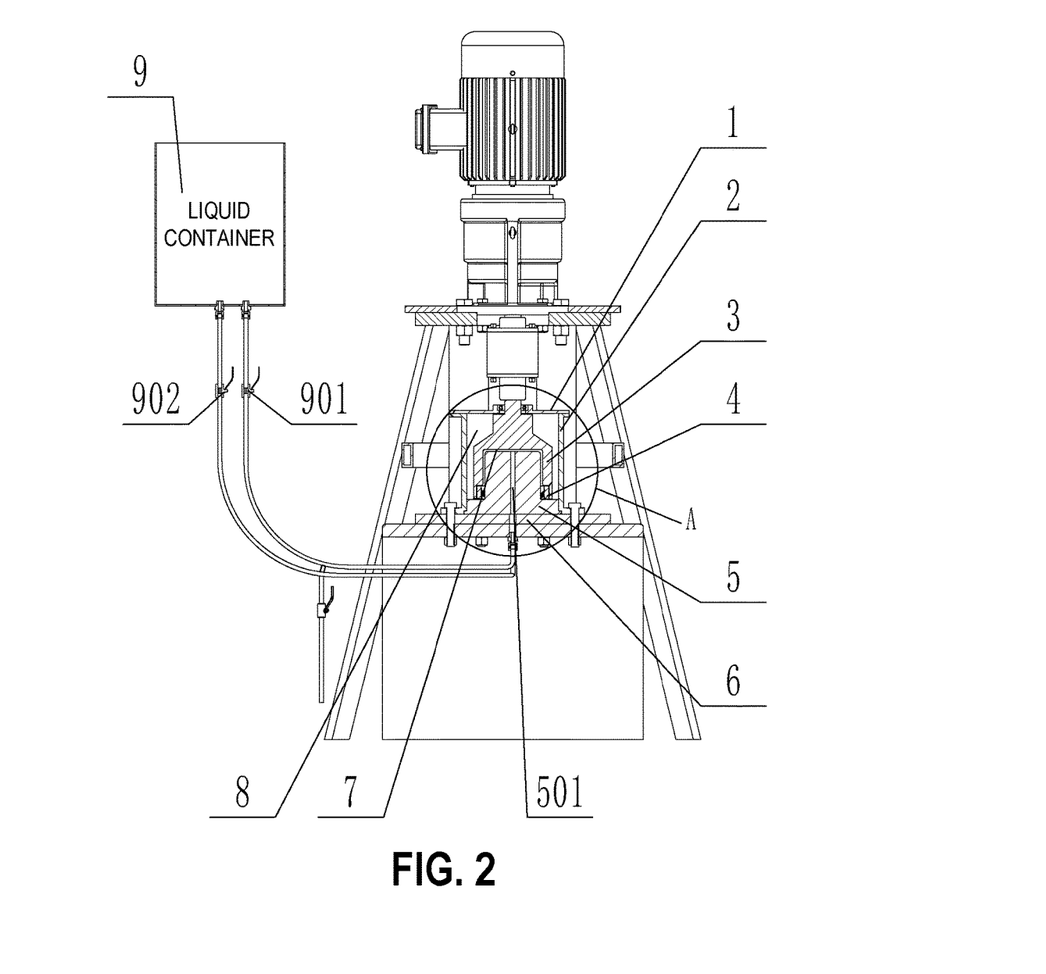
FIG. 2 is a front elevational cross section view of the vertical high-speed testing device for a spiral seal of a cone bit bearing of FIG. 1.
Figure 3:
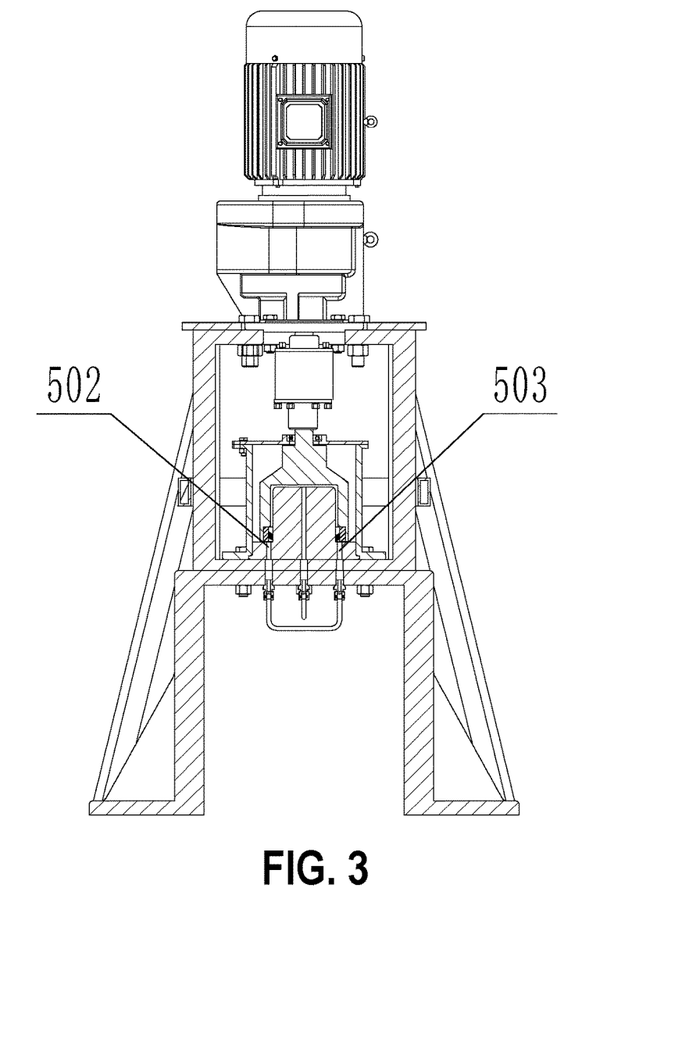
FIG. 3 is a side elevational cross section view of the vertical high-speed testing device for a spiral seal of a cone bit bearing of FIG. 1.
Figure 4:
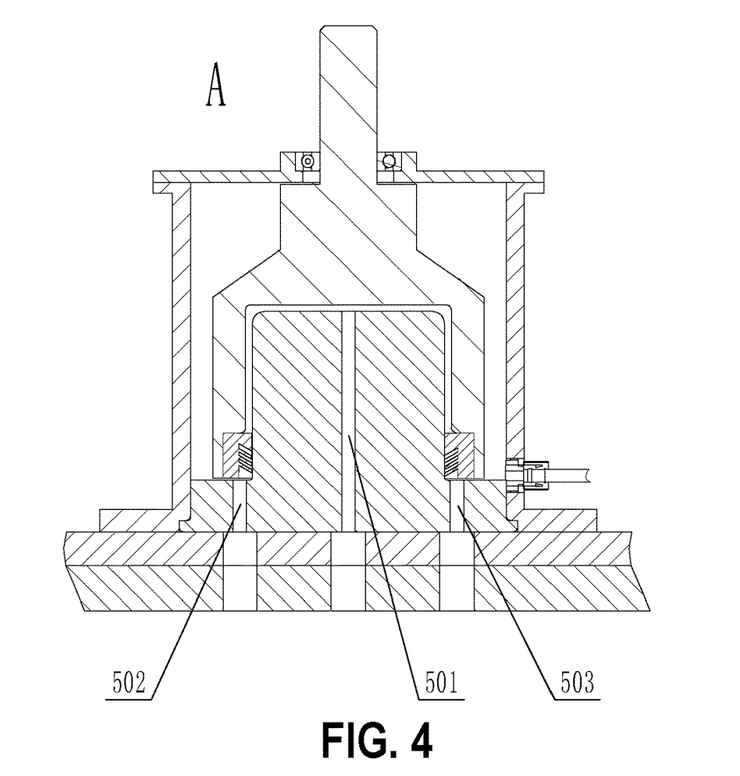
FIG. 4 is an enlarged view of detail A from FIG. 2, showing further details of the vertical high-speed testing device for a spiral seal of a cone bit bearing.
Figure 5:
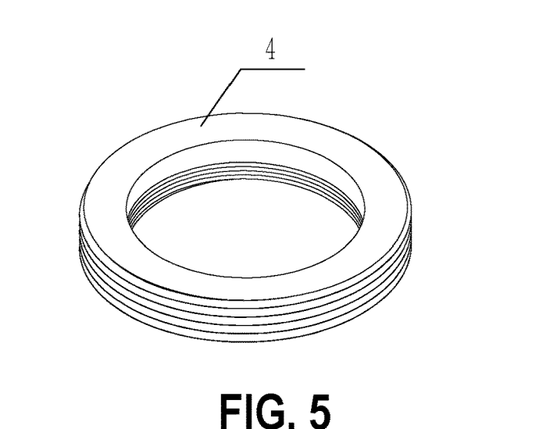
FIG. 5 is a top perspective view of a spiral sleeve included in the vertical high-speed testing device of FIG. 1.
Figure 6:
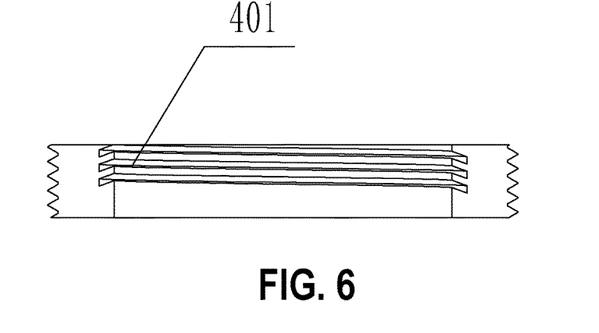
FIG. 6 is a side cross-sectional view of the spiral sleeve of FIG. 5.

Referring to FIGS. 1 to 6, the present invention provides a vertical high-speed testing device for a spiral seal of a cone bit bearing, including an upper fixed plate 1, a liquid cylinder 2, a cone 3, a spiral sleeve 4, a shaft 5 and a lower fixed plate 6. The spiral sleeve 4 is in threaded connection to the cone 3. Both the cone 3 and the spiral sleeve 4 are sheathed on the shaft 5. Sealing threads 401 are provided on an inner surface of the spiral sleeve 4, and there is a clearance between the sealing threads 401 and the shaft 5. A first sealed cavity 7 is formed between the cone 3 and the shaft 5. A first through hole 501 communicated with the first cavity 7 is formed in the shaft 5. Each of the cone 3, the spiral sleeve 4 and the shaft 5 is arranged inside the liquid cylinder 2. The upper fixed plate 1 and the lower fixed plate 6 are connected to upper and lower ends of the liquid cylinder 2, respectively, to form a second cavity 8 communicated with the first cavity 7.

For the vertical high-speed testing device for a spiral seal of a cone bit bearing of the present invention, sealing threads 401 are provided on an inner side of the spiral sleeve 4 to simulate a spiral seal structure for the cone bit bearing, and the cone 3 is in threaded connection to the spiral sleeve 4. By replacing the simulated spiral seal with the sealing threads 401 on the inner wall of the spiral sleeve 4, the mounting problem during a spiral seal test is solved, and it is convenient to replace different types of spiral sleeves 4 during the test to stimulate the sand draining performances of different spiral seal structures. Meanwhile, it is not necessary to replace the cone frequently, so that the cost is saved, the test efficiency is improved and the applicability of the cone 3 is improved. During the test, the cone 3 drives the spiral sleeve 4 to rotate. There is a clearance (generally about 0.5 mm to 1.0 mm) between the sealing threads 401 and the shaft 5. In this embodiment, the clearance between the sealing threads 401 and the shaft 5 is 0.5 mm. The sand draining performance of the spiral seal is tested by measuring the time required to drain the sand-containing liquid. Thus, the smooth production and application of spiral seal products is assured.

During the test, a certain amount of sand-containing liquid is fed into the first cavity 7 through the first through hole 501. The sand-containing liquid flows to the sealing threads 401 on the spiral sleeve 4 along the first cavity 7, then flows out from the clearance between the sealing threads 401 and the shaft 5 and the clearance between the cone 3 and the shaft 5, and flows into the second cavity 8 through the clearance between the cone 3 and the shaft 5. Subsequently, the sand-containing liquid in the second cavity 8 flows to the outside of the device. When the sand-containing liquid in the second cavity 8 is completely drained, the used time is recorded as the time required to drain sand when the sealing threads 401 have no pumping effect. When the cone 3 drives the spiral sleeve 4 to rotate, the above operations are repeated, and a same amount of sand-containing liquid is fed into the first cavity 7. In this case, the rotation of the sealing threads 401 on the spiral sleeve 4 generates a pumping effect, and the time required to completely drain the sand-containing liquid is recorded. By comparing the time required to completely drain the sand-containing liquid, the sealing performance of the sealing threads 401 on the spiral sleeve 4 may be evaluated.

Specifically, a second through hole 502 and a third through hole 503 are further provided on the shaft 5. Both the second through hole 502 and the third through hole 503 are communicated with the second cavity 8, and the second through hole 502 and the third through hole 503 are communicated with each other through a pipeline.

For the vertical high-speed testing device for a spiral seal of a cone bit bearing of the present invention, the sand draining performance of the spiral seal may also be tested by measuring the amount of the drained sand. During the test, the sand-containing liquid is fed into the clearance between the shaft 5 and the sealing threads 401 on the spiral sleeve 4 through the second through hole 502 and the third through hole 503. The sand-containing liquid to be injected is weighed in advance. The cone 3 drives the spiral sleeve 4 to rotate. If the sealing threads 401 on the spiral sleeve 4 have good pumping and sand draining performance, the sand-containing liquid is unable to enter the first cavity 7, and instead, the sand-containing liquid enters the second cavity 8 along the clearance between the spiral sleeve 4 and the shaft 5 and the clearance between the cone 3 and the shaft 5 and is then drained out of the device from the second cavity 8. If the sealing threads 401 on the spiral sleeve 4 have poor pumping and sand draining performance, part of the sand-containing liquid will enter the first cavity 7 through the sealing threads 401 and is then drained out of the device through the first through hole 501. The part of the sand-containing liquid drained out of the device from the second cavity 8 is weighed, and the weight is recorded as the amount of sand which is pumped and drained by the sealing threads 401 on the spiral sleeve 4. By comparing the amount of the drained sand, the sealing performance of the sealing threads 401 on the spiral sleeve 4 may be evaluated.

More specifically, the first through hole 501 is arranged coaxially to the shaft 5, and the second through hole 502 and the third through hole 503 are symmetrically arranged relative to an axis of the shaft.

A distance between an axis of the second through hole 502 and an axis of the third through hole 503 is not greater than the inner diameter of the cone 3. In this embodiment, the second through hole 502 and the third through hole 503 directly face the clearances between the cone 3 and the shaft 5, so that the sand-containing liquid is prevented from directly flowing into the second cavity 8 without contacting the sealing threads 401, and the test result is thus more accurate.

Further, the vertical high-speed testing device for a spiral seal of a cone bit bearing further includes a liquid container 9 used for storing the sand-containing liquid. The first through hole 501, the second through hole 502 and the third through hole 503 are each communicated with the liquid container 9 through pipelines. A first valve 901 is provided on the pipeline connecting the first through hole 501 to the liquid container 9, so that it is convenient to control the output amount of the sand-containing liquid. Meanwhile, a second valve 902 is provided on the pipeline communicating the liquid container 9 with the second through hole 502 and the second through hole 503 to accurately control the amount of the output sand-containing liquid. Thus, the accuracy of the test result is ensured, and the continuity of multiple tests is also ensured for saving time.

In addition, in other embodiments of the present invention, a weight sensing device may also be additionally provided on the liquid container 9 to improve the test efficiency and save human and material resources; and, a vibration device may also be additionally provided on the liquid container 9 to make the output of the sand-containing liquid more uniform and prevent the accumulation of gravel from blocking the outlet of the liquid container 9. In this embodiment of the present invention, the position of the liquid container 9 in the vertical direction is higher than the positions of the cone 3, the spiral sleeve 4 and the shaft 5, so that the sand-containing liquid in the liquid container 9 can smoothly flow into the corresponding positions during the test. In other embodiments of the present invention, a delivery pump may also be additionally provided to ensure that the sand-containing liquid in the liquid container 9 can be exported smoothly during the test.

Still further, the vertical high-speed testing device for a spiral seal of a cone bit bearing further includes a collecting container 10. The collecting container 10 is communicated with the second cavity 8 through a pipeline. The first through hole 501 is further communicated with the outside through a pipeline, and a valve is provided on the pipeline communicating the first through hole 501 with the outside. The collecting container 10 collects the sand-containing liquid drained out of the device from the second cavity 8 for weighing, and the collected sand-containing liquid can be reused. The first through hole 501 is connected to a pipeline communicated with the outside, a valve is additionally provided on this pipeline, and the pipeline communicating the first through hole 501 with the outside is arranged between the first through hole 501 and the first valve 901. Thus, the sand-containing liquid is prevented from flowing back to the liquid container 9 to influence the test result, during its drainage to the outside through the first through hole 501.

The spiral sleeve 4 is in threaded connection to the cone 3. The threaded connection is simple in structure and stable, and it is convenient to replace a plurality of different spiral sleeves 4 to test the sand draining performance of the sealing threads 401.

The vertical high-speed testing device for a spiral seal of a cone bit bearing further includes a motor 11 and a holder 12. The motor 11 is connected to the cone 3 through a coupler, and both the motor 11 and the lower fixed plate 6 are fixed to the holder 12. The motor 11 provides a power source for the high-speed rotation of the cone 3 for testing the sand draining performance of the sealing threads 401. The motor 11 drives the cone 3 to rotate at a high speed, and the cone 3 drives the spiral sleeve 4 to rotate at a high speed, so that the sealing threads 401 generate a pumping effect. Here, it is to be noted that the direction of rotation of the cone 3 is preferably opposite to the direction of turning of the threads at a joint of the cone 3 and the spiral sleeve 4 in order to prevent the loosening of the spiral sleeve 4 from influencing the normal operation of the test.

The vertical high-speed testing device for a spiral seal of a cone bit bearing further includes a bottom plate 13. The holder 12 is fixed on the bottom plate 13 through foundation bolts. The holder 12 provides a support for the vertical high-speed testing device for a spiral seal of a cone bit bearing. By fixing the holder 12 on the bottom plate 13 through foundation bolts, the shake, displacement or the like of the device during the test can be prevented from influencing the rest result, and the overall stability of the device is thus improved. An axis of the cone 3 is perpendicular to a plane of the bottom plate 13.

The vertical high-speed testing device for a spiral seal of a cone bit bearing of the present invention includes an upper fixed plate 1, a liquid cylinder 2, a cone 3, a spiral sleeve 4, a shaft 5 and a lower fixed plate 6. The spiral sleeve 4 is in threaded connection to the cone 3. Both the cone 3 and the spiral sleeve 4 are sheathed on the shaft 5. Sealing threads 401 are provided on an inner surface of the spiral sleeve 4, and there is a clearance between the sealing threads 401 and the shaft 5. A first sealed cavity 7 is formed between the cone 3 and the shaft 5. A first through hole 501, a second through hole 502 and a third through 503 are formed in the shaft 5. The first through hole 501 is communicated with the first cavity 7. Each of the cone 3, the spiral sleeve 4 and the shaft 5 is arranged inside the liquid cylinder 2. The upper fixed plate 1 and the lower fixed plate 6 are connected to upper and lower ends of the liquid cylinder 2, respectively, to form a second cavity 8 communicated with the first cavity 7. During the test, the cone 3 drives the spiral sleeve 4 to rotate at a high speed, and a certain amount of sand-containing liquid is fed into the first cavity 7 through the first through hole 501. The sand-containing liquid flows to the sealing threads 401 on the spiral sleeve 4 along the first cavity 7, and the sealing threads 401 are rotated at a high speed to generate a pumping effect. The sand-containing liquid flows out from the clearance between the sealing threads 401 and the shaft 5 and from the clearance between the cone 3 and the shaft 5, and then flows into the second cavity 8 through the clearance between the cone 3 and the shaft 5. The sand-containing liquid in the second cavity 8 flows out of the device. When the sand-containing liquid in the second cavity 8 is completely drained, the used time is recorded as the time required to drain sand. The time required to drain sand may be used for evaluating the sand draining performance of the sealing threads 401 on the spiral sleeve 4, so that the smooth production and application of spiral seal products can be assured.

Specific examples are used herein to illustrate the principle and embodiments of the present invention, which are only used to help understand the methodology and concept of the present invention. Meanwhile, various alterations to the embodiments and applications may come to those skilled in the art according to the concept of the present invention. In conclusion, the description should not be construed as limiting the present invention.

While the present invention has been illustrated by a description of exemplary embodiments and while these embodiments have been described in some detail, it is not the intention of the Applicant to restrict or in any way limit the scope of the appended claims to such detail. Additional advantages and modifications will readily appear to those skilled in the art. The various features of the disclosure may be used alone or in any combination depending on the needs and preferences of the user. Further, features that are described and/or illustrated with respect to one embodiment may be used in the same way or in a similar way in one or more other embodiments and/or in combination with or instead of the features of the other embodiments. This has been a description of the present invention, along with the preferred methods of practicing the present invention as currently known. However, the invention itself should only be defined by the appended claims.

What is claimed is:

1. A vertical high-speed testing device for a spiral seal of a cone bit bearing, comprising:
    an upper fixed plate;
    a cone;
    a shaft, in which a first through hole, a second through hole and a third through hole are formed;
    a spiral sleeve, which is in threaded connection to the cone, and an inner surface of which is provided with sealing threads, and there is a clearance between the sealing threads and the shaft;
    a liquid cylinder, inside which the cone, the spiral sleeve and the shaft are all arranged; and
    a lower fixed plate;
    wherein, both the cone and the spiral sleeve are sheathed on the shaft; a first cavity, which is sealed, is formed between the cone and the shaft; the first through hole is communicated with the first cavity; the upper fixed plate and the lower fixed plate are connected to upper and lower ends of the liquid cylinder, respectively, to form a second cavity communicated with the first cavity.

2. The vertical high-speed testing device of claim 1, wherein both the second through hole and the third through hole are communicated with the second cavity, and the second through hole and the third through hole are communicated with each other through a pipeline.

3. The vertical high-speed testing device of claim 2, wherein the first through hole is arranged coaxially to the shaft, and the second through hole and the third through hole are symmetrically arranged relative to an axis of the shaft.

4. The vertical high-speed testing device of claim 2, further comprising:
    a liquid container, wherein the first through hole, the second through hole and the third through hole are each communicated with the liquid container through pipelines.

5. The vertical high-speed testing device of claim 1, further comprising:
    a collecting container, wherein the collecting container is communicated with the second cavity through a pipeline, the first through hole is further communicated with the outside through a pipeline, and a valve is provided on the pipeline communicating the first through hole with the outside.

6. The vertical high-speed testing device of claim 1, further comprising:
    a motor and a holder, wherein the motor is connected to the cone through a coupler, and both the motor and the lower fixed plate are fixed to the holder.

7. The vertical high-speed testing device of claim 6, further comprising:
    a bottom plate, wherein the holder is fixed on the bottom plate.

8. The vertical high-speed testing device of claim 7, wherein an axis of the cone is perpendicular to a plane of the bottom plate.

* * * * *